(12) United States Patent
Yokota et al.

(10) Patent No.: US 9,274,502 B2
(45) Date of Patent: Mar. 1, 2016

(54) IMAGE FORMING APPARATUS WITH AIR SUPPLY DEVICE FOR BLOCKING INFILTRATION OF OUTSIDE AIR

(71) Applicant: FUJI XEROX CO., LTD., Tokyo (JP)

(72) Inventors: Shusaku Yokota, Kanagawa (JP); Yuichi Mikuni, Kanagawa (JP); Youji Nishida, Kanagawa (JP); Tomoaki Kitamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/467,961

(22) Filed: Aug. 25, 2014

(65) Prior Publication Data

US 2015/0268627 A1    Sep. 24, 2015

(30) Foreign Application Priority Data

Mar. 24, 2014  (JP) .................................. 2014-060561

(51) Int. Cl.
*G03G 21/20* (2006.01)

(52) U.S. Cl.
CPC .................................. *G03G 21/206* (2013.01)

(58) Field of Classification Search
CPC .................................................. G03G 21/206

USPC .............................................. 399/92, 95, 177
See application file for complete search history.

(56) References Cited

U.S. PATENT DOCUMENTS

| 5,729,793 | A  | * | 3/1998  | Inoue ............................. 399/92 |
| 5,749,025 | A  | * | 5/1998  | Oda et al. ........................ 399/92 |
| 6,151,211 | A  | * | 11/2000 | Dayan et al. ............. 361/679.48 |
| 6,888,727 | B2 | * | 5/2005  | Chang ...................... 361/679.48 |
| 6,947,281 | B2 | * | 9/2005  | Wrycraft et al. .............. 361/695 |
| 7,324,774 | B2 | * | 1/2008  | Kaiho ............................. 399/92 |
| 2008/0007922 | A1 | * | 1/2008 | Hallin et al. |
| 2008/0253796 | A1 | * | 10/2008 | Idehara et al. ................. 399/92 |

FOREIGN PATENT DOCUMENTS

| JP | A-2005-252894 | 9/2005 |
| JP | A-2006-276131 | 10/2006 |

* cited by examiner

*Primary Examiner* — Susan Lee
(74) *Attorney, Agent, or Firm* — Oliff PLC

(57) ABSTRACT

Provided is an image forming apparatus including an image reader that is disposed on an upper side of an image forming apparatus body and is provided with an opening portion through which wiring connected to the image forming apparatus body side passes, and an air supply device that is provided in the image forming apparatus body or in the image reader, and forms an air flow that blocks infiltration of outside air into the image reader on an outer side of the opening portion.

14 Claims, 6 Drawing Sheets

IMAGE FORMING APPARATUS WITH AIR SUPPLY DEVICE FOR BLOCKING INFILTRATION OF OUTSIDE AIR

CROSS-REFERENCE TO RELATED APPLICATIONS

This application is based on and claims priority under 35 USC 119 from Japanese Patent Application No. 2014-060561 filed Mar. 24, 2014.

BACKGROUND

Technical Field

The present invention relates to an image forming apparatus.

SUMMARY

According to an aspect of the invention, there is provided an image forming apparatus including:

an image reader that is disposed on an upper side of an image forming apparatus body and is provided with an opening portion through which wiring connected to the image forming apparatus body side passes; and an air supply device that is provided in the image forming apparatus body or in the image reader, and forms an air flow that blocks infiltration of outside air into the image reader on an outer side of the opening portion.

BRIEF DESCRIPTION OF THE DRAWINGS

Exemplary embodiments of the present invention will be described in detail based on the following figures, wherein.

DETAILED DESCRIPTION

Figure 1:
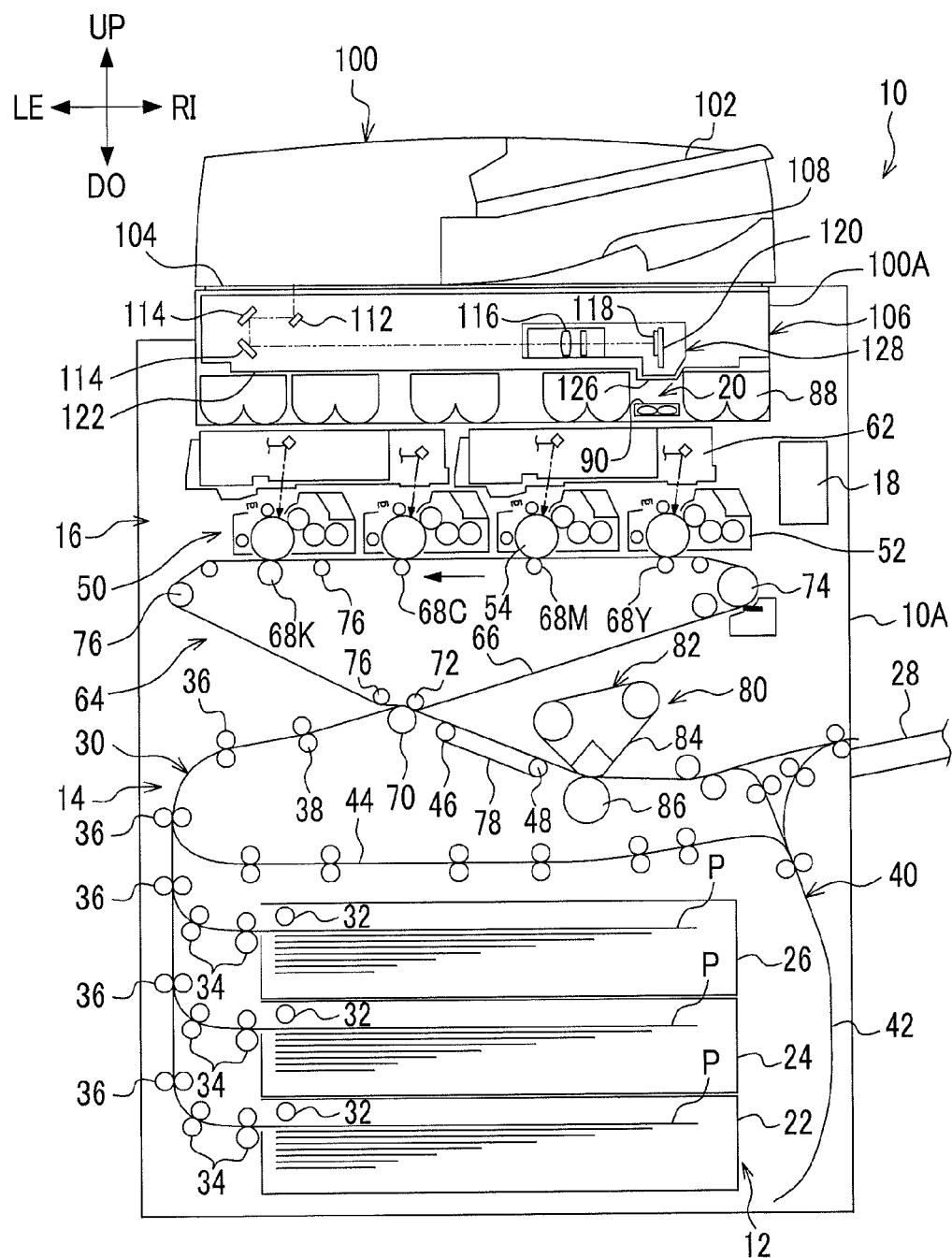
FIG. 1 is a front view illustrating the overall configuration of an image forming apparatus provided with an image reader.
Figure 4:
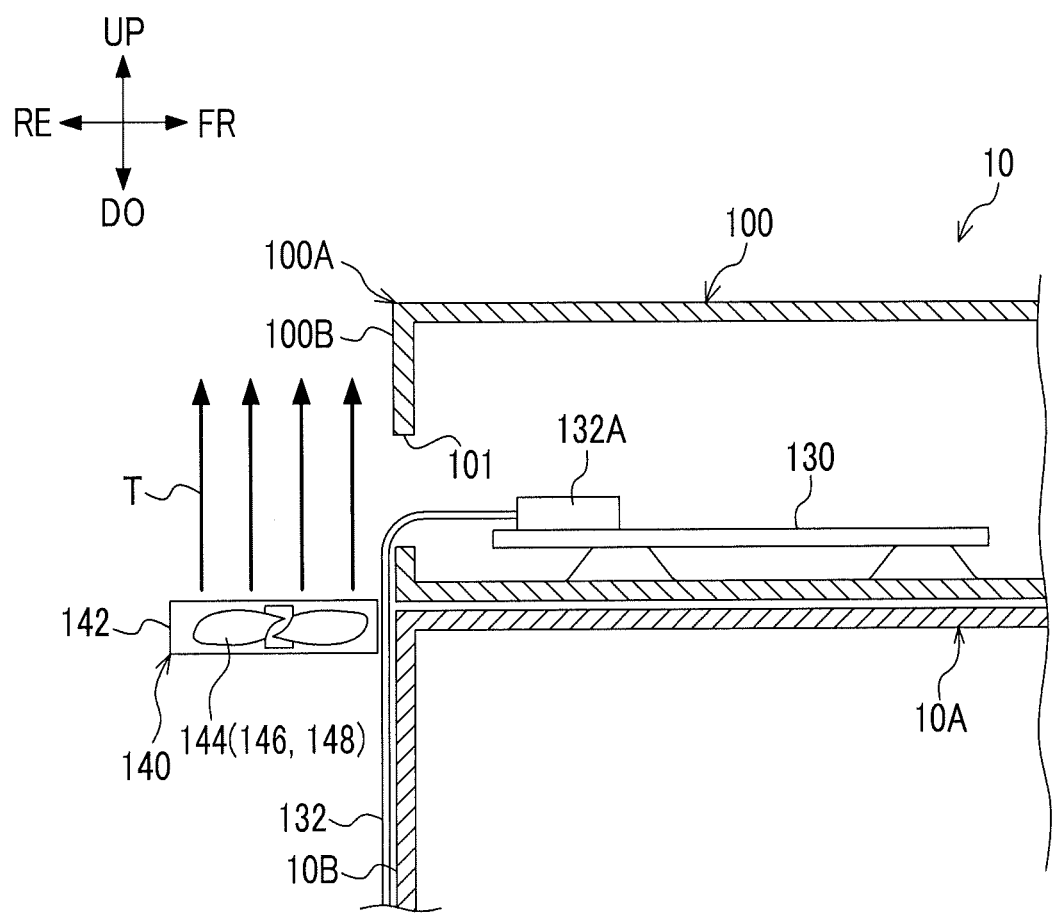
FIG. 4 is a schematic view illustrating an air curtain formed by the air supply device according to the first exemplary embodiment.
Figure 5:
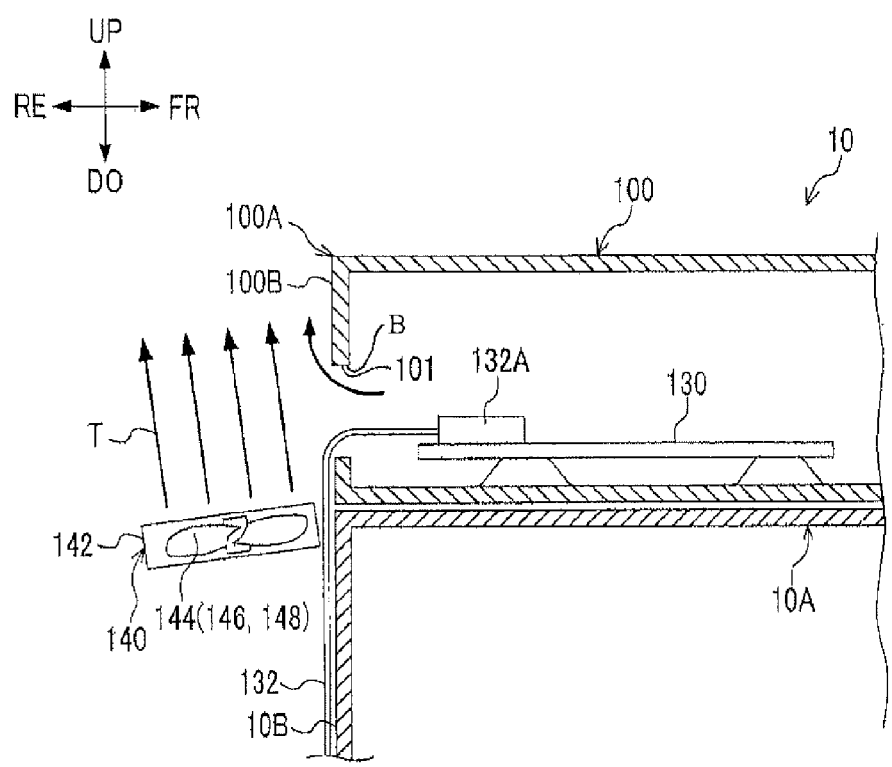
FIG. 5 is a schematic view illustrating the air curtain which is changed in angle by the air supply device according to the first exemplary embodiment.

Hereinafter, exemplary embodiments of the invention will be described in detail with reference to the drawings. As illustrated in FIG. 1, when an image forming apparatus 10 is viewed from the front, the arrow RI is referred to as a right direction, the arrow LE is referred to as a left direction, the arrow UP is referred to as an upward direction, and the arrow DO is referred to as a downward direction. In addition, as illustrated in FIGS. 4 and 5, when an image reader 100 is viewed from the side, the arrow FR is referred to as a forward direction, and the arrow RE is referred to as a rearward direction. In the following description, there may be cases where the upstream side in a transporting direction of a recording medium (recording sheet P) is simply referred to as an "upstream side" and the downstream side in the transporting direction of the recording medium (recording sheet P) is simply referred to as a "downstream side".

As illustrated in FIG. 1, the image forming apparatus 10 includes an image forming apparatus body 10A as a housing constituted by many frame members and panel members. On the lower side of the image forming apparatus body 10A, a sheet accommodating unit 12 that accommodates recording sheets P as an example of a recording medium is disposed, and on the upper side of the sheet accommodating unit 12, a transporting unit 14 that transports the recording sheet P to a main operation unit 16, which will be described later, is disposed.

On the upper side of the transporting unit 14, the main operation unit 16 that forms an image on the recording sheet P supplied from the sheet accommodating unit 12 is disposed, and on the upper side of the main operation unit 16, the image reader 100 that reads a document (not illustrated) is disposed. In the main operation unit 16, a controller 18 that controls the operation of each unit of the image forming apparatus 10 and the image reader 100 is provided.

The sheet accommodating unit 12 includes a first accommodating unit 22, a second accommodating unit 24, and a third accommodating unit 26 that respectively accommodate recording sheets P having different sizes. The transporting unit 14 includes feed rolls 32, transport rolls 34 and 36, registration rollers 38, and the like for transporting the recording sheets P having different sizes that are respectively accommodated in the first, second, and third accommodating units 22, 24, and 26.

Specifically, on the upper left end portions of the first, second, and third accommodating units 22, 24, and 26, the feed rolls 32 that feed the accommodated recording sheets P one by one are respectively disposed. On the downstream sides of the feed rolls 32, the transport rolls 34 that transport the fed recording sheets P to a transport path 30 of the transporting unit 14 are respectively disposed.

In the transport path 30 on the downstream side of each transport roll 34, the transport roll 36 that transports the recording sheets P one by one is disposed. In addition, on the downstream side of the transport roll 36, the registration roller 38 that temporarily stops the recording sheet P, feeds the recording sheet P to a secondary transfer position, which will be described later, at a predetermined timing, and aligns the transfer position of an image is disposed.

On the downstream side of the transport path 30 from a fixing device 80, which will be described later, and on the upstream side from a discharge unit 28, a duplex transport path 40 that transports and reverses the recording sheet P when an image is formed on the rear surface of the recording sheet P is connected. Between the transport path 30 and the duplex transport path 40, an introduction member (not illustrated) for introducing the recording sheet P from the transport path 30 to the duplex transport path 40 is provided.

The duplex transport path 40 includes a reversing unit 42 that is formed in a straight line shape directed to the downward side when the image forming apparatus 10 is viewed from the front and temporarily stores the recording sheet P having an image formed on the surface thereof. In addition, the duplex transport path 40 includes a supply path 44 that is formed in a substantially straight line shape directed from the right to the left and supplies the recording sheet P stored in the reversing unit 42 to the transport roll 36 again. On the rear surface of the recording sheet P which is fed to the transport roll 36 again by the supply path 44, an image is also transferred at the secondary transfer position, which will be described later.

Figure 2:
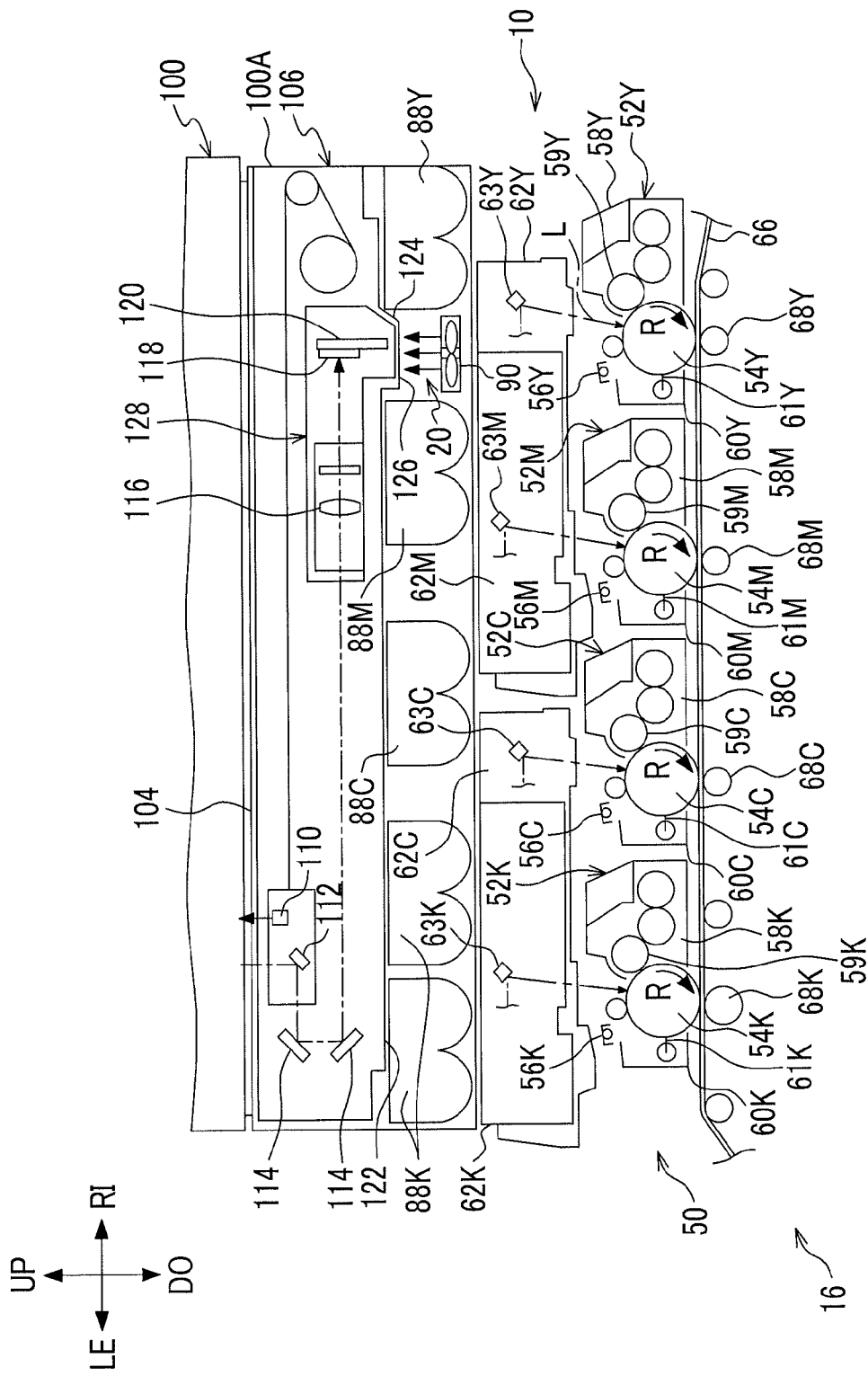
FIG. 2 is an enlarged front view illustrating a part of the image forming apparatus provided with the image reader.

As illustrated in FIGS. 1 and 2, the main operation unit 16 includes an image forming section 50 that forms a toner image on the recording sheet P, and the fixing device 80 that fixes the toner image formed on the recording sheet P by the image forming section 50, onto the recording sheet P with heat and pressure.

The image forming section 50 is configured to include: image forming units 52Y, 52M, 52C, and 52K having image holding members 54Y, 54M, 54C, and 54K that respectively correspond to yellow (Y), magenta (M), cyan (C), and black (K) toners; exposure units 62Y, 62M, 62C, and 62K that irradiate the outer circumferential surfaces of the image holding members 54Y, 54M, 54C, and 54K with a light beam L to expose the outer circumferential surfaces; and a transfer unit 64 that transfers toner images formed on the outer circumferential surfaces of the image holding member 54Y, 54M, 54C, and 54K onto the recording sheet P.

In the following description, in a case where colors yellow (Y), magenta (M), cyan (C), and black (K) need to be distinguished from each other, characters of Y, M, C, and K are attached to reference numerals. In the same manner, in a case where Y, M, C, and K do not need to be distinguished from each other in the description, the characters Y, M, C, and K after the reference numerals are omitted.

The image forming unit 52 is configured to include the columnar image holding member 54 of which the axial direction is the forward and rearward direction and which may be rotated in the arrow R direction (clockwise direction in the figure) by driving a motor (not illustrated), and a charging unit 56, a developing unit 58, and a cleaning device 60 that oppose the outer circumferential surface of the image holding member 54 and are sequentially arranged from the upstream side to the downstream side in the rotation direction.

The exposure unit 62 has a configuration in which the light beam L emitted by a light source (not illustrated) is scanned by a rotating polygon mirror (not illustrated) and is reflected by optical components including a reflection mirror 63 to irradiate the outer circumferential surface of the image holding member 54. The image holding member 54 is disposed on the lower side of the exposure unit 62.

The light beam L emitted by the exposure unit 62 is allowed to irradiate the outer circumferential surface of the image holding member 54 between the charging unit 56 and the developing unit 58. Furthermore, an intermediate image transfer belt 66, which will be described later, comes into contact with the outer circumferential surface of the image holding member 54 between the developing unit 58 and the cleaning device 60.

The charging unit 56 is configured as, as an example, a corotron-type charging unit that charges the charged outer circumferential surface of the image holding member 54 with the same polarity as that of toner through a corona discharge by applying a voltage to a wire. In addition, the outer circumferential surface of the image holding member 54 is irradiated with the light beam L on the basis of image data, thereby forming an electrostatic latent image.

The developing unit 58 accommodates, as an example, a developer in which carrier particles made of a magnetic material and negatively charged toner are mixed with each other, and includes a cylindrical developing sleeve 59 in which magnet rolls (not illustrated) having plural magnetic poles in the circumferential direction are provided on the inner side.

The developing unit 58 forms a magnetic brush at a portion opposing the image holding member 54 as the developing sleeve 59 rotates.

Furthermore, as a developing bias is applied to the developing sleeve 59 by a voltage applying unit (not illustrated), the developing unit 58 develops the electrostatic latent image on the outer circumferential surface of the image holding member 54 with toner, thereby forming a toner image (developer image). In addition, to the developing unit 58 for each color, toner is supplied from a toner cartridge 88 for the corresponding color, which is provided on the upper side of the image forming section 50.

The cleaning device 60 includes a cleaning blade 61 that comes into contact with the outer circumferential surface of the image holding member 54 so that toner remaining on the outer circumferential surface of the image holding member 54 is scraped off by the cleaning blade 61 so as to be recovered. In addition, on the downstream side in the rotation direction of the image holding member 54 from the developing unit 58, the intermediate image transfer belt 66 on which the toner image developed by the developing unit 58 is first transferred is provided.

As illustrated in FIG. 1, the transfer unit 64 is configured to include: the intermediate image transfer belt 66 having an endless shape; a primary image transfer roller 68 that first transfers the toner image onto the intermediate image transfer belt 66 from the image holding member 54; and a secondary image transfer roll 70 and an auxiliary roll 72 that secondarily transfer the toner images sequentially overlapped on the intermediate image transfer belt 66 onto the recording sheet P.

On the inner side of the intermediate image transfer belt 66, a driving roller 74 that is rotatably driven, and plural following rolls 76 that are rotatably configured are disposed. In addition, the intermediate image transfer belt 66 is wound around the primary image transfer rollers 68Y, 68M, 68C, and 68K, the driving roller 74, the following rolls 76, and the auxiliary roll 72. The intermediate image transfer belt 66 is configured to circularly rotate in the counterclockwise direction which is illustrated in the figure, by the rotation of the driving roller 74.

The primary image transfer roller 68 has a configuration in, which, as an example, an elastic layer (not illustrated) is provided in the periphery of a columnar shaft made of a metal such as stainless steel, and may be rotated as both end portions of the shaft are supported by bearings. In addition, in the primary image transfer roller 68, a voltage (positive voltage) having an opposite polarity to the polarity of the toner is applied to the shaft from a power source (not illustrated).

The secondary image transfer roll 70 has, as an example, the same configuration as the primary image transfer roller 68 and is disposed on the downstream side of the registration roller 38 in the transport path 30 to be rotatable. In addition, the secondary image transfer roll 70 comes into contract with the surface (outer surface) of the intermediate image transfer belt 66 at a secondary transfer position while interposing the intermediate image transfer belt 66 between the secondary image transfer roll 70 and the auxiliary roll 72. The secondary image transfer roll 70 is grounded.

The auxiliary roll 72 forms a counter electrode of the secondary image transfer roll 70, and a secondary transfer voltage (negative voltage) is applied thereto via a power supply roll (not illustrated) made of a metal, which is disposed to come into contact with the outer circumferential surface of the auxiliary roll 72. As the secondary transfer voltage is applied to the auxiliary roll 72 and thus a potential difference is generated between the auxiliary roll 72 and the secondary image transfer roll 70, the toner image on the intermediate image transfer belt 66 is secondarily transferred onto the recording sheet P that is transported to a contact portion between the secondary image transfer roll 70 and the intermediate image transfer belt 66.

On the downstream side from the secondary image transfer roll 70, a transporting belt 78 is provided that transports the recording sheet P on which the secondary transfer of the toner image is ended, to the fixing device 80. The transporting belt 78 is wound around a support roll 46 and a driving roller 48 and circularly rotates to transport the recording sheet P to the fixing device 80.

The fixing device 80 includes a heating belt mechanism 82 provided with a fixing belt 84 that thermally fixes the toner image transferred onto the recording sheet P, and a press roller 86 that presses the recording sheet P against the fixing belt 84. Therefore, the toner image transferred onto the recording sheet P is heated and pressed by the fixing belt 84 and the press roller 86 while the recording sheet P is transported, thereby being fixed onto the recording sheet P.

Next, the image reader 100 will be described. As illustrated in FIG. 1, the image reader 100 includes a document placing table 102 on which documents (not illustrated) may be placed, a platen glass 104 on which a single document is placed, a document reading unit 106 that reads the document placed (scanned) on the platen glass 104, and a document discharge unit 108 to which the read document is discharged.

As illustrated in FIG. 2, the document reading unit 106 includes an image reader body 100A as a housing constituted by many frame members and panel members. In the image reader body 100A, a light irradiation unit 110 that irradiates the document placed (scanned) on the platen glass 104 with light, and a single full rate mirror 112 and two half rate mirrors 114 that reflect the reflected light, which is irradiated by the light irradiation unit 110 and is reflected from the document, in a direction parallel to the platen glass 104 to be turned back are provided.

Furthermore, the document reading unit 106 includes a focusing lens 116 on which the reflected light that is turned back by the full rate mirror 112 and the half rate mirrors 114 is incident, and a photoelectric conversion element 118 that converts the reflected light imaged by the focusing lens 116 into an electrical signal. In addition, the photoelectric conversion element 118 that is disposed to oppose the focusing lens 116 is provided on a substrate 120. In addition, a light receiving system 128 is constituted by at least the focusing lens 116 and the photoelectric conversion element 118 (the substrate 120).

Moreover, as illustrated in FIG. 2, the image reader 100 is provided on the upper side of the toner cartridge 88. That is, a panel member (not illustrated) or the like that covers the upper portion of the image forming apparatus body 10A is not provided between the toner cartridge 88 and the image reader 100, but the image reader 100 is directly disposed on the upper surface side of the toner cartridge 88.

Specifically, in the image reader body 100A, a bottom wall immediately below a part where the substrate 120 is disposed becomes a protruding bottom wall 126 that protrudes downward from a bottom wall 122 immediately below the other part. In addition, the bottom wall 122 and the protruding bottom wall 126 are connected integrally with each other by a connection wall 124.

In addition, the protruding bottom wall 126 is disposed between the toner cartridge 88Y and the toner cartridge 88M (the connection wall 124 overlaps the toner cartridge 88 in the upward and downward direction) so that the image reader body 100A is directly disposed on the upper surface side of the toner cartridges 88Y, 88M, 88C, and 88K. Therefore, avoid between the toner cartridge 88Y and the toner cartridge 88M becomes a receiving portion 20 that is formed in the image forming apparatus body 10A and receives the protruding bottom wall 126.

On the upper side of the exposure unit 62 in the receiving portion 20, an exhaust fan 90 as an example of a blowing fan is provided. The exhaust fan 90 is a fan that discharges air in the image forming apparatus body 10A and blows a cooling wind in the upward direction. The protruding bottom wall 126 is directly cooled by the exhaust fan 90.

Figure 3:
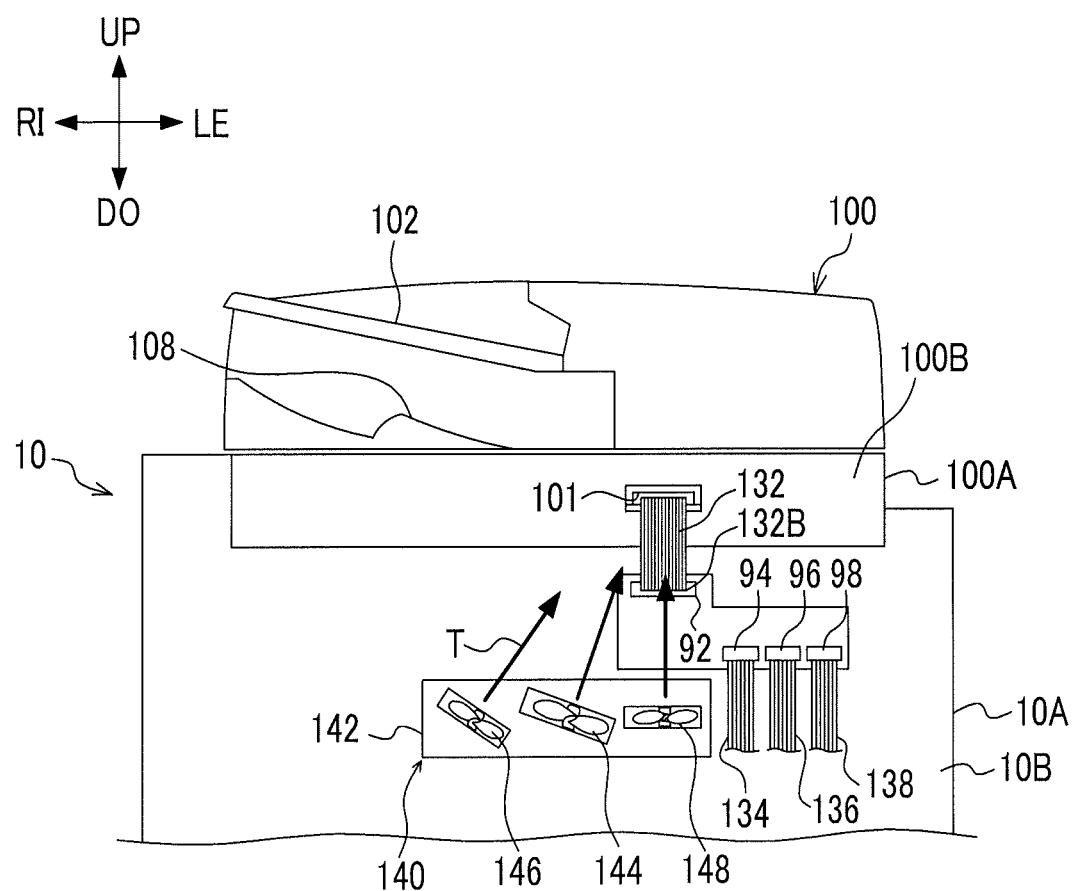
FIG. 3 is a rear view illustrating the image forming apparatus provided with an air supply device according to a first exemplary embodiment.

As illustrated in FIGS. 3 and 4, in a rear wall 100B of the image reader body 100A, an opening portion 101 is formed through which a wire harness 132 as an example of wiring passes. The opening portion 101 is formed to be horizontally long so that the longitudinal direction thereof is the left and right direction, and one end portion 132A of the wire harness 132 that passes through the opening portion 101 is connected to a substrate 130 provided in the image reader body 100A.

In a rear wall 10B of the image forming apparatus body 10A immediately below the opening portion 101, a connector 92 is provided, and the other end portion 132B of the wire harness 132 is connected to the connector 92. On the lower side of the connector 92, plural (for example, three) connectors 94, 96, and 98 are provided to be arranged in the left and right direction.

One end portions of wire harnesses 134, 136, and 138 are respectively connected to the connectors 94, 96, and 98, and each of the wire harnesses 134, 136, and 138 is drawn to the lower side. The other end portions of the wire harnesses 134, 136, and 138 are connected to devices (for example, the image forming unit 52, the exposure unit 62, the transfer unit 64, and the like) provided in the image forming apparatus body 10A.

First Exemplary Embodiment

Next, an air supply device 140 according to a first exemplary embodiment will be described. As illustrated in FIG. 3, the air supply device 140 includes a fan unit 142 that is mounted on the rear wall 10B (outer side) of the image forming apparatus body 10A. Specifically, at the center portion of the fan unit 142 in the left and right direction, a large-diameter fan 144 having a large rotational diameter is disposed, and on both sides of the large-diameter fan 144 in the left and right direction, small-diameter fans 146 and 148 having smaller rotational diameters are respectively disposed.

The air supply device 140 includes a drive motor (not illustrated) that independently (or simultaneously) drives the large-diameter fan 144 and the small-diameter fans 146 and 148 in the fan unit 142 to rotate, and the like. In addition, a power source for driving the drive motor may be obtained from the image forming apparatus 10 side or may be obtained from the image reader 100 side. Otherwise, the power source may be obtained from outside the image forming apparatus 10 and the image reader 100.

As illustrated in FIG. 4, the air supply device 140 is provided on the lower side of the opening portion 101 so as to form an air curtain (air flow) T that flows from the lower side to the upper side substantially along the rear wall 100B of the image reader body 100A on the rear side (outer side) of the opening portion 101. Through the air curtain T, the infiltration of outside air into the image reader body 100A (the image reader 100) is blocked.

In addition, as illustrated in FIG. 3, the air supply device 140 according to the first exemplary embodiment is mounted on the rear wall 10B side (outer side) of the image forming apparatus body 10A shifted to the right from the connector 94 so as not to interfere with each of the wire harnesses 134, 136, and 138. Therefore, the small-diameter fan 146 and the large-diameter fan 144 that are distant from the opening portion 101 are disposed so that the rotating shafts thereof are oblique with respect to the vertical direction so as to blow a wind toward at least the opening portion 101 in the rear view.

The small-diameter fans 146 and 148 may be exhaust fans that discharge air in the image forming apparatus body 10A similarly to the exhaust fan 90 or may be provided in the image forming apparatus body 10A. In any case, by using the air curtain T formed by the large-diameter fan 144 and the small-diameter fans 146 and 148, infiltration of dust and the like through the opening portion 101 is suppressed or prevented.

Next, the action (mainly the action of the air supply device 140) of the image forming apparatus 10 including the air supply device 140 according to the first exemplary embodiment having the above-described configuration will be described.

When a document is to be copied (or scanned), the document is placed on the document placing table 102 of the image reader 100 or placed on the platen glass 104, and copying (or scanning) is started by operating an operation panel (not illustrated). That is, the document is read by the document reading unit 106. In addition, the read image data is sent to the main operation unit 16.

Then, the outer circumferential surfaces of the image holding members 54 are charged by the respective charging units 56 and are exposed by the light beam L emitted by the respective exposure units 62 according to the sent image data. Accordingly, electrostatic latent images are formed on the outer circumferential surfaces of the image holding members 54. In addition, the electrostatic latent images formed on the outer circumferential surfaces of the image holding members 54 are developed as toner images of the colors yellow (Y), magenta (M), cyan (C), and black (K) by the respective developing units 58.

Next, the toner images formed on the outer circumferential surfaces of the image holding members 54 are sequentially transferred onto the intermediate image transfer belt 66 by the respective primary image transfer rollers 68 at a first transfer position. The toner images transferred on the intermediate image transfer belt 66 to be overlapped are secondarily transferred by the secondary image transfer roll 70 and the auxiliary roll 72, onto the surface of the recording sheet P that is transported from the transport path 30, at the secondary transfer position.

The recording sheet P having the toner image which has been transferred onto the surface thereof is transported toward the fixing device 80 by the transporting belt 78. In addition, the toner image on the surface of the recording sheet P is heated and pressed by the fixing device 80. Accordingly, the toner image is fixed on the surface of the recording sheet P. The recording sheet P having the toner image fixed thereon is discharged to the discharge unit 28. In this manner, a series of image forming processes are completed.

In a case where a toner image is to be formed on the rear surface of the recording sheet P where no image is formed (in a case of duplex printing), the recording sheet P having the toner image fixed on the surface is fed to the duplex transport path 40. In addition, the recording sheet P is transported to the transport roll 36 again by the duplex transport path 40 and the toner image is transferred onto the rear surface of the recording sheet P at the secondary transfer position. The toner image of the recording sheet P having the toner image transferred on the rear surface thereof is fixed by the fixing device 80, and thereafter the recording sheet P is discharged to the discharge unit 28.

Here, as illustrated in FIG. 2, a panel member and the like are not provided between the image reader body 100A and the image forming apparatus body 10A, and the protruding bottom wall 126 of the image reader body 100A is disposed in the receiving portion 20 between the toner cartridge 88Y and the toner cartridge 88M.

Therefore, an increase in the speed of image formation, an improvement in image quality, an increase in the life span of consumables, and the like are achieved. As a result, even when the region of the main operation unit 16 is enlarged, compared to a configuration in which panel members are provided between the image reader body 100A and the image forming apparatus body 10A, an increase in the height position of the image reader 100 from the floor is suppressed or prevented.

That is, without damaging the operability of the image reader 100, an increase in the speed of image formation and the like are realized. Furthermore, due to the configuration in which a panel member and the like are not provided between the image reader body 100A and the image forming apparatus body 10A, there is an advantage that a reduction in manufacturing cost is achieved compared to the configuration in which panel members are provided.

In addition, a cooling wind is blown toward the protruding bottom wall 126 in the image reader body 100A by the exhaust fan 90 provided in the receiving portion 20 so that the protruding bottom wall 126 is cooled. Therefore, a temperature increase in the light receiving system 128 (particularly the substrate 120) that is installed on the inner side (the upper side) of the protruding bottom wall 126 and is likely to trap heat is suppressed.

In addition, in the configuration in which the image reader 100 is directly disposed on the upper surface of the toner cartridge 88, dust such as scattering toner is likely to infiltrate from the opening portion 101. However, as illustrated in FIGS. 3 and 4, on the rear side (outer side) of the opening portion 101, the air curtain T is formed by the large-diameter fan 144 and the small-diameter fans 146 and 148 (the fan unit 142), and thus infiltration of outside air into the image reader body 100A is blocked.

Therefore, infiltration of dust such as scattering toner from the opening portion 101 is suppressed or prevented, and thus occurrence of image defects caused by the dust such as scattering toner is suppressed or prevented. Here, the faster the wind speed of the air curtain T formed by the large-diameter fan 144 and the small-diameter fans 146 and 148 is, the stronger the effect of blocking the inside of the image reader body 100A from outside air becomes. Accordingly, as illustrated in FIG. 3, it is preferable that the air supply device 140 be disposed at a position (on the lower side since the opening portion 101 is horizontally long) as close as possible to the opening portion 101.

In a case where the image forming apparatus 10 (the image reader 100) is used in a cold region or the like, as outside air (cold air) infiltrates from the opening portion 101, dew condensation occurs on the rear surface of the platen glass 104, and there is concern that image defects caused by the dew condensation may occur.

However, since the air curtain T is formed on the rear side (outer side) of the opening portion 101, infiltration of outside air (cold air) into the image reader body 100A is suppressed or prevented, and thus occurrence of dew condensation in the image reader 100 is suppressed or prevented. In this case, it is preferable that relay control be performed so as to drive the air supply device 140 not only when the image forming apparatus 10 is operated but also in a standby state.

In addition, as illustrated in FIG. 5, the air curtain T formed by the air supply device 140 may be allowed to flow at an angle at which a portion thereof on the upper end portion (one end portion) side of the opening portion 101 is further from the opening portion 101 than a portion thereof on the lower end portion (the other end portion) side in a side view. That is, the fan unit 142 may be configured so that the upper sides of the rotating shafts of the large-diameter fan 144 and the small-diameter fans 146 and 148 are inclined outward in the forward and rearward direction.

In this case, a flow of air suctioned to the outside from the opening portion 101 is generated by the air curtain T, and thus infiltration of dust or outside air from the opening portion 101 is further suppressed or prevented. In addition, only the upper side of the rotating shaft of the large-diameter fan 144 may be inclined outward in the forward and rearward direction so that only the air curtain T formed by the large-diameter fan 144 flows at an angle at which the flow becomes distant from the opening portion 101.

Second Exemplary Embodiment

Next, the air supply device 140 according to a second exemplary embodiment will be described. Like elements as those of the first exemplary embodiment are denoted by like reference numerals, and detailed description (including common actions) thereof is appropriately omitted.

Figure 6:
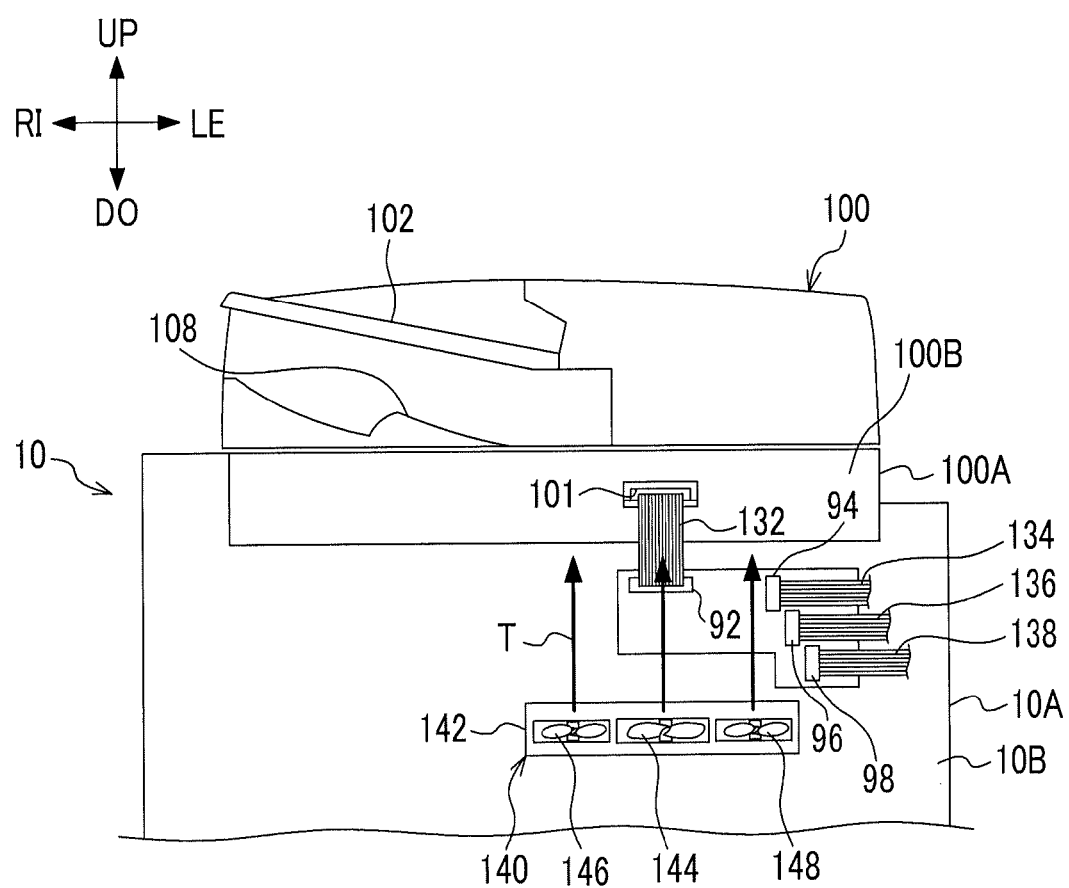
FIG. 6 is a rear view illustrating the image forming apparatus provided with an air supply device according to a second exemplary embodiment.

As illustrated in FIG. 6, in the second exemplary embodiment, the plural (for example, three) connectors 94, 96, and 98 are provided to be lined up in an upward and downward direction on the outer side (left side) in the left and right direction of the connector 92. One end portions of the wire harnesses 134, 136, and 138 are respectively connected to the connectors 94, 96, and 98, and each of the wire harnesses 134, 136, and 138 is drawn to the outer side (to the left) in the left and right direction.

Therefore, the air supply device 140 is mounted on the rear wall 10B side (outer side) of the image forming apparatus body 10A immediately below the opening portion 101. That is, the rotating shafts of the large-diameter fan 144 and the small-diameter fans 146 and 148 in the fan unit 142 follow the vertical direction in the rear view. Therefore, the air curtain T that flows from the lower side to the upper side on the rear side (outer side) of the opening portion 101 is more efficiently formed than in the first exemplary embodiment, and thus infiltration of outside air into the image reader body 100A is more effectively blocked.

In addition, in the air supply device 140 according to the second exemplary embodiment, the fan unit 142 may be configured so that, as illustrated in FIG. 5, the upper sides of the rotating shafts of the large-diameter fan 144 and the small-diameter fans 146 and 148 (at least the large-diameter fan 144) are inclined outward in the forward and rearward direction in a side view. That is, in the air supply device 140 according to the second exemplary embodiment, the air curtain T may be allowed to flow at an angle at which the air curtain T becomes distant from the opening portion 101.

While the image forming apparatus 10 according to this exemplary embodiment has been described with reference to the drawings, the image forming apparatus 10 according to this exemplary embodiment is not limited to the drawings and may be appropriately changed in design without departing from the concept of the invention. For example, the air supply device 140 may be provided on the rear wall 100B side of the image reader body 100A, that is, on the upper side of the opening portion 101 at position B, and the air curtain T may be formed to flow from the upper side to the lower side.

In addition, the fan unit 142 may also be configured to include only a single fan (for example, only the large-diameter fan 144) and is not limited to the configuration having plural fans. Furthermore, other than the small-diameter fans 146 and 148, by using an exhaust fan (not illustrated) and the like provided inside the image forming apparatus body 10A in advance, the air curtain T that blocks infiltration of outside air into the image reader body 100A may be formed on the rear side (outer side) of the opening portion 101.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an image reader that is disposed on an upper side of an image forming apparatus body and is provided with an opening portion through which wiring connected to the image forming apparatus body side passes; and
    an air supply device that is provided in the image forming apparatus body or in the image reader, and forms an air flow that blocks infiltration of outside air into the image reader on an outer side of the opening portion.

2. The image forming apparatus according to claim 1,
    wherein the air supply device forms the air flow at an angle at which a portion of the air flow on one end portion side of the opening portion is farther from the opening portion than a portion of the air flow on the other end portion side of the opening portion in a side view.

3. The image forming apparatus according to claim 1,
    wherein the air supply device is disposed on a lower side of the opening portion.

4. The image forming apparatus according to claim 2,
    wherein the air supply device is disposed on a lower side of the opening portion.

5. The image forming apparatus according to claim 3,
    wherein the air supply device is disposed immediately below the opening portion.

6. The image forming apparatus according to claim 4,
    wherein the air supply device is disposed immediately below the opening portion.

7. The image forming apparatus according to claim 1, further comprising:
    a blowing fan that is provided in the image forming apparatus body and blows a cooling wind toward a bottom wall in a part where a light receiving system of the image reader is disposed.

8. The image forming apparatus according to claim 2, further comprising:
    a blowing fan that is provided in the image forming apparatus body and blows a cooling wind toward a bottom wall in a part where a light receiving system of the image reader is disposed.

9. The image forming apparatus according to claim 3, further comprising:

a blowing fan that is provided in the image forming apparatus body and blows a cooling wind toward a bottom wall in a part where a light receiving system of the image reader is disposed.

10. The image forming apparatus according to claim 4, further comprising:
a blowing fan that is provided in the image forming apparatus body and blows a cooling wind toward a bottom wall in a part where a light receiving system of the image reader is disposed.

11. The image forming apparatus according to claim 5, further comprising:
a blowing fan that is provided in the image forming apparatus body and blows a cooling wind toward a bottom wall in a part where a light receiving system of the image reader is disposed.

12. The image forming apparatus according to claim 6, further comprising:
a blowing fan that is provided in the image forming apparatus body and blows a cooling wind toward a bottom wall in a part where a light receiving system of the image reader is disposed.

13. The image forming apparatus according to claim 1, wherein the air supply device is disposed on an upper side of the opening portion.

14. The image forming apparatus according to claim 2, wherein the air supply device is disposed on an upper side of the opening portion.

* * * * *